(12) United States Patent
Sunell

(10) Patent No.: US 10,681,590 B2
(45) Date of Patent: Jun. 9, 2020

(54) METHOD AND APPARATUS FOR HANDOVER PROCEDURES IN A COMMUNICATION NETWORK

(71) Applicant: Telefonaktiebolaget LM Ericsson (publ), Stockholm (SE)

(72) Inventor: Kai-Erik Sunell, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 405 days.

(21) Appl. No.: 15/309,478

(22) PCT Filed: Apr. 9, 2015

(86) PCT No.: PCT/SE2015/050423
§ 371 (c)(1),
(2) Date: Nov. 8, 2016

(87) PCT Pub. No.: WO2015/171040
PCT Pub. Date: Nov. 12, 2015

(65) Prior Publication Data
US 2017/0188269 A1  Jun. 29, 2017

Related U.S. Application Data

(60) Provisional application No. 61/991,037, filed on May 9, 2014.

(51) Int. Cl.
*H04W 4/00* (2018.01)
*H04W 36/00* (2009.01)
(Continued)

(52) U.S. Cl.
CPC ......... *H04W 36/0016* (2013.01); *H04W 8/22* (2013.01); *H04W 36/0005* (2013.01);
(Continued)

(58) Field of Classification Search
CPC . H04W 36/0016; H04W 76/27; H04W 36/08; H04W 36/0005; H04W 8/22;
(Continued)

(56) References Cited

U.S. PATENT DOCUMENTS 8,620,324 B2 * 12/2013 Jeong ................... H04B 17/318
 370/331
9,686,772 B2 * 6/2017 Chen ................. H04W 72/0406
(Continued)

OTHER PUBLICATIONS

European Search Report issued in Application No. 15789607.7 dated Nov. 14, 2017, 4 pages.
(Continued)

*Primary Examiner* — Phuc H Tran
(74) *Attorney, Agent, or Firm* — Rothwell, Figg, Ernst & Manbeck, P.C.

(57) ABSTRACT

The embodiments of the invention, as described below, introduce a new full configuration flag to distinguish full configurations of low complexity category UEs from other categories. The new full configuration flag will also be referred to herein as an "enhanced" full configuration flag. A network node, such as a source eNB, can see the enhanced full configuration flag from the RRC configuration message that is prepared by another network node, for example a target eNB. If the target eNB sends a RRC configuration that contains a legacy version of the full configuration flag for a low complexity category UE, the source eNB knows that the target eNB does not comprehend Rel-12 and the low complexity category. Accordingly the source eNB can refrain from performing the handover. In addition, the UE can infer from the flag version if the target eNB has comprehended the UE category and accordingly it knows whether the configuration is valid or not. The embodiments of the invention described herein have the advantage that un-necessary signaling caused by failed handovers and unsuccessful RRC
(Continued)

connection re-establishments are avoided. Consequently, network resources are used in a more efficient manner and UE battery lifetime is prolonged.

16 Claims, 10 Drawing Sheets

(51) Int. Cl.
*H04W 8/22* (2009.01)
*H04W 36/08* (2009.01)
*H04W 76/27* (2018.01)

(52) U.S. Cl.
CPC ........... *H04W 36/08* (2013.01); *H04W 76/27* (2018.02); *Y02D 70/00* (2018.01); *Y02D 70/122* (2018.01); *Y02D 70/1242* (2018.01); *Y02D 70/1262* (2018.01); *Y02D 70/142* (2018.01); *Y02D 70/21* (2018.01)

(58) Field of Classification Search
CPC .... Y02D 70/122; Y02D 70/21; Y02D 70/142; Y02D 70/1242; Y02D 70/1262; Y02D 70/00
See application file for complete search history.

(56) References Cited

U.S. PATENT DOCUMENTS

| | | | |
|---|---|---|---|
| 2012/0100851 A1* | 4/2012 | Zheng | H04W 36/0094 455/436 |
| 2013/0058311 A1* | 3/2013 | Park | H04W 36/0033 370/331 |
| 2013/0078956 A1* | 3/2013 | Feng | H04W 12/04 455/411 |
| 2013/0083753 A1 | 4/2013 | Lee et al. | |
| 2013/0084864 A1* | 4/2013 | Agrawal | H04W 36/0083 455/436 |
| 2014/0321432 A1* | 10/2014 | Li | H04W 36/08 370/331 |
| 2015/0237540 A1* | 8/2015 | Van Lieshout | H04W 36/0055 455/436 |
| 2015/0271763 A1* | 9/2015 | Balachandran | H04B 17/23 370/338 |
| 2015/0319748 A1* | 11/2015 | Huang | H04W 36/0033 370/329 |
| 2015/0327142 A1* | 11/2015 | Martinez Tarradell | H04W 24/10 455/436 |
| 2015/0334609 A1* | 11/2015 | Waldhauser | H04W 36/0061 455/436 |
| 2016/0007213 A1* | 1/2016 | Cui | H04W 4/70 370/230 |
| 2017/0245252 A1* | 8/2017 | Gao | H04L 69/322 |

OTHER PUBLICATIONS

European Office Action issued in Application No. 15789607.7 dated Dec. 1, 2017, 9 pages.
Intel Corporation, "Discussion on new UE category", 3GPP TSG RAN WG2 Meeting #85, R2-140495, Prague, Czech Republic, Feb. 10-14, 2014, 6 pages.
Intel Corporation, "Discussion on open aspects for low cost MTC UEs", 3GPP TSG RAN WG2 Meeting #85bis, R2-141228, Valencia, Spain, Mar. 31-Apr. 4, 2014, 7 pages.
Ericsson, "Introduction of category handling for low complexity UEs (option3)", 3GPP TSG RAN WG2 Meeting #86, R2-142123, Seoul, South Korea, May 19-23, 2014, 4 pages.
International Search Report and Written Opinion issued in corresponding International Application No. PCT/SE2015/050423, dated Sep. 23, 2015, 16 pages.
Huawei and HiSilicon, "Introduction of Category σ for low cost MTC," 3GPP TSG-RAN WG2 #85, R2-140964, Prague, Czech Republic, Feb. 10-14, 2014, 3 pages.
Ericsson, "Handover for low cost MTC feature," 3GPP TSG-RAN WG2 #85bis, R2-141311, Valencia, Spain, Mar. 31-Apr. 4, 2014, 2 pages.
Ericsson, "Handling of low complexity UE categories during handover," 3GPP TSG-RAN WG2 #86, R2-142120, Seoul, South Korea, May 19-23, 2014, 4 pages.
3GPP TS 36.331 V12.1.0 (Mar. 2014), "3rd Generation Partnership Project; Technical Specification Group Radio Access Network; Evolved Universal Terrestrial Radio Access (E-UTRA); Radio Resource Control (RRC); Protocol specification (Release 12)," 356 pages.

* cited by examiner

METHOD AND APPARATUS FOR HANDOVER PROCEDURES IN A COMMUNICATION NETWORK

CROSS-REFERENCE TO RELATED APPLICATION(S)

This application is a 35 U.S.C. § 371 National Phase Entry Application from PCT/SE2015/050423, filed Apr. 9, 2015, and designating the United States, which claims priority to U.S. Provisional Application No. 61/991,037, filed May 9, 2014. The contents of both applications are incorporated by reference.

TECHNICAL FIELD

The present invention relates to a method and apparatus for handover procedures in a communication network, for example handover procedures involving low complexity category user equipment.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular network. The communication may be performed e.g. between two terminals, between a terminal and a regular telephone and/or between a terminal and a server via a Radio Access Network (RAN) and possibly one or more core networks, comprised within the cellular communications network.

Examples of wireless communication systems are Long Term Evolution (LTE), Universal Mobile Telecommunications System (UMTS) and Global System for Mobile communications (GSM).

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, machine to machine devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. Data transmission in LTE is controlled by the radio base station.

One function of 3GPP cellular radio technologies is the control of user mobility by using the Radio Resource Control (RRC) and X2AP protocols. The network controls the handover of UEs in RRC Connected mode from one cell to another, whereas a UE in Idle mode performs cell selection and reselection itself. Embodiments herein are illustrated with examples from the Evolved Universal Terrestrial Radio Access (EUTRA) also known as LTE system.

When the UE is handed over from a source cell to a target cell, handover preparation is needed. Upon handover preparation the target radio base station or eNB is provided the current UE RRC configuration comprised in the handover preparation information message (the HandoverPreperationInformation message, for example as described in technical Specification TS36.331, version 12.1.0). This message is used to transfer the E-UTRA RRC information used by the target eNB during handover preparation, including UE capability information. The target eNB decides the RRC configuration after the handover and therefore a RRC configuration message is transparently sent to the UE via the source eNB as an octet string comprised in the handover command. Normally full configuration is required if the target eNB has a different Access Stratum (AS) version than the source eNB.

If the RRC configuration in the handover preparation message is incomplete or the source cell has configured the UE with a RRC protocol version that is not comprehended by the target eNB, the target eNB typically performs a full configuration (if possible), i.e. performs a reconfiguration from scratch. Otherwise the target eNB may modify or maintain the current RRC configuration.

3GPP has recently agreed within the scope of low-cost Machine Type Communication (MTC) work item to introduce a new UE category termed as a "low complexity category" (which may also be referred to as category 0, or category 11). A draft Change Request (CR) for the introduction of the low complexity category is available in R2-140964 as presented during the RAN2#85 meeting from 10.02.2014 to 14.02.2014, in Prague, Czech Republic. A problem arises, since this new category is less capable than legacy UE categories, for example, legacy category 1. Furthermore, the legacy categories (including categories 1, 2, 3, 4 and 5 that were first introduced with Release 8 of the RRC protocol), such as category 1, are mandatory to signal even though the low complexity category UE does not have any such category, and thus full configuration will always be required from the legacy eNB because it has a different AS version than the source eNB. In other words, since a legacy UE-Category field is mandatory required to be present in the UE-EUTRA-Capability container, omitting such a mandatory field results in a decoding error, and therefore to avoid this all UEs shall indicate one category in the mandatory field even if they do not support any such category.

Accordingly, upon handover preparation, a legacy target eNB that does not comprehend the new low complexity category may erroneously assume that the UE may be successfully configured with the indicated legacy category, for example a legacy category such as category 1. Consequently, the handover fails and the UE experiences a radio link failure. Subsequently, the UE tries to trigger RRC Connection Re-establishment which also fails. Finally the UE transitions to Idle mode where it searches for suitable cells.

This has the disadvantage of causing unnecessary signaling due to the failed handovers and the unsuccessful RRC connection re-establishment requests, which results in the inefficient use of bandwidth.

SUMMARY

It is an aim of the present invention to provide a method and apparatus which obviate or reduce at least one or more of the disadvantages mentioned above.

According to a first aspect of the present invention there is provided a method in a target base station during an attempted handover procedure of a user equipment (UE) from a source base station to the target base station. The method comprises the steps of determining if a full configuration is needed and if the user equipment is of a low complexity category, and if so, setting a first configuration flag setting of an enhanced full configuration flag, the first configuration flag setting relating to Release 12 (Rel 12) and above of a radio resource control (RRC) protocol. The method further comprises the step of determining if a full configuration is needed, and if so, setting a third configuration flag setting of the enhanced full configuration flag, the third configuration flag setting relating to release 9 to release 11 (Rel-9 to Rel11) of the RRC protocol.

According to another aspect of the present invention there is provided a method performed in a source base station during an attempted handover procedure of a user equipment (UE) from the source base station to a target base station. The method comprises the steps of: receiving a RRC configuration message from the target base station; reading one or more flag settings of an enhanced full configuration flag contained in the RRC configuration message; and determining from the one or more flag settings whether the target base station is capable of processing a low complexity category UE. The determined information is used to decide whether to continue or abort a handover procedure with the target base station.

According to another aspect of the present invention there is provided a method in a user equipment for use in a handover procedure from a source base station to a target base station. The method comprises the steps of: receiving a handover command from a source base station; determining from one or more flag settings of an enhanced full configuration flag if a target base station is capable of performing a handover operation with the user equipment based on its category; and if so, executing a handover operation with the target base station.

According to another aspect of the present invention there is provided a method of performing a handover operation of a user equipment from a source base station to a target base station. The method comprises the steps of providing an enhanced full configuration flag, wherein the enhanced full configuration flag comprises one or more additional configuration flag settings, in addition to a standard full configuration flag setting, for enabling full configurations of low complexity category UEs to be distinguished from other category UEs.

According to another aspect of the present invention there is provided a method in a user equipment (UE). The method comprises the steps of: determining from an enhanced version of a full configuration flag whether a target base station comprehends low complexity category UEs, and deciding whether or not to abort a handover with the target base station based on the result of the determination.

According to another aspect of the present invention there is provided a method in a source base station. The method comprises the steps of: determining from an enhanced version of a full configuration flag received in a RRC configuration message from a target base station whether a target base station comprehends low complexity category user equipment (UEs), and deciding whether or not to abort a handover procedure with the target base station based on the result of the determination.

According to another aspect of the present invention there is provided a target base station for use in an attempted handover procedure of a user equipment (UE) from a source base station to the target base station. The target base station comprises a processing module adapted to determine if a full configuration is needed and if the user equipment is of a low complexity category. A setting module is adapted to set a first configuration flag setting of an enhanced full configuration flag, if it is determined that a full configuration is needed and the user equipment is of a low complexity category, wherein the first configuration flag setting relates to Release 12 (Rel 12) and above of a radio resource control (RRC) protocol. The processing module is further adapted to determine if a full configuration is needed, and if so, the setting module is adapted to set a third configuration flag setting of the enhanced full configuration flag, the third configuration flag setting relating to release 9 to release 11 (Rel-9 to Rel11) of the RRC protocol.

According to another aspect of the present invention there is provided a source base station for use in an attempted handover procedure of a user equipment (UE) from the source base station to a target base station. The source base station comprises: a receiving module adapted to receive a RRC configuration message from the target base station. A reading module is adapted to read one or more flag settings of an enhanced full configuration flag contained in the RRC configuration message. A processing module is adapted to determine from the one or more flag settings whether the target base station is capable of processing a low complexity category UE. The processing module is adapted to use the determined information to decide whether to continue or abort a handover procedure with the target base station.

According to another aspect of the present invention there is provided a user equipment comprising: a receiving module adapted to receive a handover command from a source base station; and a processing unit adapted to determine from one or more flag settings of an enhanced full configuration flag if a target base station is capable of performing a handover operation with the user equipment based on its category. The processing unit is adapted to execute a handover operation with the target base station based on the outcome of the determining process.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The embodiments of the invention, as described below, introduce a new full configuration flag to distinguish full configurations of low complexity category UEs from other categories. The new full configuration flag will also be referred to herein as an "enhanced" full configuration flag. A network node, such as a source eNB, can see the enhanced full configuration flag from the RRC configuration message that is prepared by another network node, for example a target eNB. If the target eNB sends a RRC configuration that contains a legacy version of the full configuration flag for a low complexity category UE, the source eNB knows that the target eNB does not comprehend Rel-12 and the low complexity category. Accordingly the source eNB can refrain from performing the handover. In addition, the UE can infer from the flag version if the target eNB has comprehended the UE category and accordingly it knows whether the configuration is valid or not.

The embodiments of the invention described herein have the advantage that unnecessary signaling caused by failed handovers and unsuccessful RRC connection re-establishments are avoided. Consequently, network resources are used in a more efficient manner and UE battery lifetime is prolonged.

Terminologies

The following common terminologies are used in the embodiments and are elaborated below:

Network node: In some embodiments a term "network node" is used and it may correspond to any type of radio network node or any network node, which communicates with at least a radio network node.

User equipment: In some embodiments the non-limiting term user equipment (UE) is used and it refers to any type of wireless device communicating with a radio network node in a cellular or mobile communication system. Examples of UEs are target device, device to device UE, MTC UE or UE capable of machine to machine communication, PDA, iPAD, Tablet, mobile terminals, smart phone, laptop embedded equipped (LEE), laptop mounted equipment (LME), USB dongles etc.

It is noted that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

It is also noted that terminology such as a first network node and a second network node should be considered to be non-limiting and does in particular not imply a certain hierarchical relation between the two.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 1:
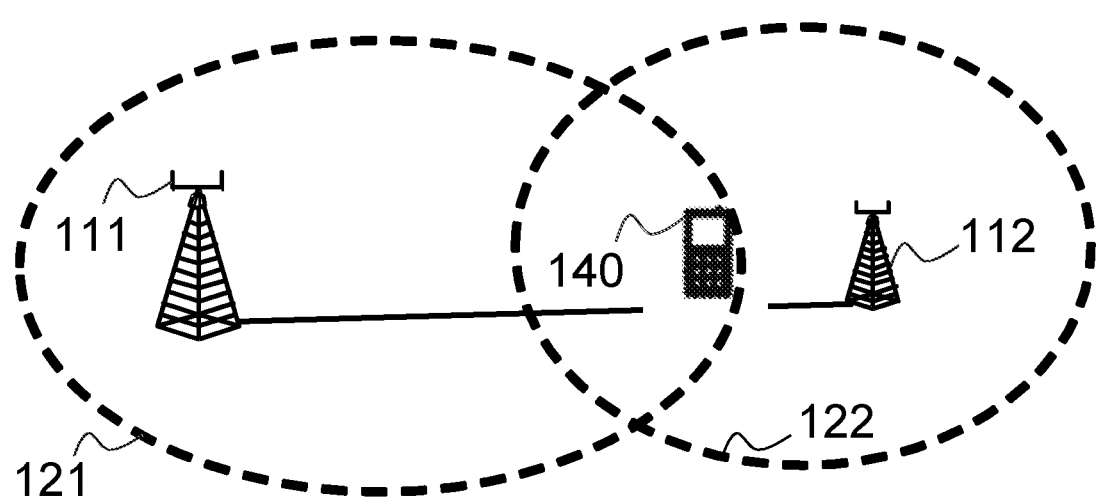
FIG. 1 shows an example of a communication network in which embodiments of the invention may be used.

Prior to describing the embodiments of the present invention, reference will first be made to FIG. 1, which depicts parts of one or more wireless communications networks 100 in which the embodiments herein may be implemented. The one or more wireless communications networks 100 may for example be LTE, UMTS, GSM, any 3GPP wireless communications network, or any cellular wireless communications network or system capable of handling UEs of more than one category or of different capabilities.

The wireless communications network 100 comprises a plurality of base stations and/or other network nodes. More specifically, the a wireless communications network 100 comprises a first network node 111. The first network node 111 is also referred to herein as a source network node. The a wireless communications network 100 further comprises a second network node 112. The second network node 112 is also referred to herein as a candidate or target network node. The first and second network nodes 111, 112 may be a base station, such as an eNB. The base station may also be referred to as a NodeB, an evolved Node B (eNB, eNode B), a base transceiver station (BTS), Access Point Base Station, base station router, or any other network unit capable of communicating with a user equipment within a cell served by the base station depending e.g. on the radio access technology and terminology used.

In some embodiments the first network node 111 and the second network node 112 belong to two different wireless communications networks. For example, the first network node 111 may belong to an UMTS network and the second network node 112 may belong to an LTE network. The first network node 111 may then be a Radio Network Controller (RNC) in the UMTS network. The first network node 111 may serve a first cell 121, also referred to as a source cell, the second network node 112 may serve a second cell 122, also referred to as a candidate cell or target cell.

A cell is a geographical area where radio coverage is provided by network node equipment such as WiFi AP equipment, base station equipment at a base station site or at remote locations in Remote Radio Units (RRU). The first network node is an example of such network node equipment. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying cells uniquely in the whole of a wireless communication network is also broadcasted in the cells. Network nodes, such as base stations and WiFi AP, communicate over the air or radio interface operating on radio frequencies with the user equipments within range of the network nodes. The user equipment transmit data over the radio interface to network nodes, such base stations and WiFi AP, in Uplink (UL) transmissions, and network nodes, such as WiFi AP and base stations, transmit data over an air or radio interface to the user equipment in Downlink (DL) transmissions.

The first network node 111 communicates with user equipments in the first cell 121, such as a user equipment 140 of the first category, also referred to as an UE or a wireless device, which is to be handed over to a cell different from the first cell 121. The handover may for example be due to mobility of the user equipment 140. The user equipment 140 is of the first category, i.e. a low complexity category (or category 0), for example an MTC user equipment.

The user equipment 140 may e.g. be a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

More specifically the following are embodiments related to the user equipment, target network node and source network node, for example relating to handover procedures that may involve user equipment having a low complexity category.

According to the embodiments of the invention defined herein, there is defined a new Rel-12 version of the "full configuration flag". The existing "full configuration flag", i.e. that was introduced in the Rel-9 version, comprises a single bit which simply indicates whether or not a full configuration is required. By introducing a new, enhanced full configuration flag, the embodiments of the invention make it possible to detect whether a target eNB comprehends Rel-12 UE categories.

Thus, the embodiments of the invention are concerned with methods and apparatus for setting values in the enhanced full configuration flag, methods and apparatus for interpreting the values.

In the embodiments described herein the new UE category will be depicted as a "low complexity category" UE. It should be noted that it is currently debated in 3GPP whether this new category should be termed as "category 0" or "category 11". The embodiments of the invention will therefore be described in relation to low complexity category UEs, which is intended to embrace category 0 or category 11 (or some other named category), if such other references are used to describe the low complexity category UEs.

The introduction of an enhanced full configuration flag requires a method for setting the enhanced full configuration flag values. Thus, according to one embodiment there is provided a method for setting the enhanced full configuration flag values in a target eNB.

Upon the reception of handover preparation information, for example from a source eNB, a target eNB normally reads the access stratum (AS) version of the current RRC configuration used by the UE and prepares a RRC configuration that will be forwarded by the source eNB to the UE. The source eNB contains the RRC configuration in the handover command. If the AS version is later than what is supported by the target eNB; the target eNB prepares a RRC configuration that normally performs a full configuration so that the UE releases the current configuration and performs a new configuration from scratch.

According to one embodiment the target eNB logic can be described with the following method that describes the actions upon the setting of values of the enhanced full configuration flag:

1. If a full configuration is needed and the UE is of category 0, include Rel-12 version of the full configuration flag to the RRC configuration message.
2. If a full configuration is needed, include Rel-9 version of the full configuration flag to the RRC configuration message.
3. Procedure ends.

In the end of the procedure, a Rel-9 full configuration flag is present if a full configuration is needed. If the UE is further of category 0 and full configuration is needed, Rel-12 full configuration flag is present. Otherwise the Rel-12 flag will be left absent. The possible outcomes from the setting method are shown in the table below where the various flags are either present or absent;

| n | Full configuration needed | Low complexity UE | Other category than low complexity | Rel-9 flag | Rel-12 flag |
|---|---|---|---|---|---|
| 1 | No | Yes | No | Absent | Absent |
| 2 | No | No | Yes | Absent | Absent |
| 3 | Yes | Yes | No | Present | Present |
| 4 | Yes | Yes | No | Absent | Present |
| 5 | Yes | No | Yes | Present | Absent |

It is noted that rather than having separate columns for whether or not the UE category is a low complexity category or another category, these two columns can be replaced by a single column which simply indicates whether or not the UE is a low complexity category.

| n | Full configuration needed | Low complexity UE, yes/no? | Rel-9 flag | Rel-12 flag |
|---|---|---|---|---|
| 1 | No | Yes | Absent | Absent |
| 2 | No | No | Absent | Absent |
| 3 | Yes | Yes | Present | Present |
| 4 | Yes | Yes | Absent | Present |
| 5 | Yes | No | Present | Absent |

It should be noted that the above-described method does not produce combination number 4, although it nevertheless is a valid combination that could be used by the source eNB (and the UE).

In the tables above it is noted that the Rel-12 flag may comprise a flag for Rel-12 and later versions, if later versions have a low complexity category.

In addition, it is noted that the Rel-9 flag may relate to any one or more of a Rel-9 version, Rel-10 version or Rel-11 version (that is, any version from Rel-9 onwards which comprises a full configuration flag, and which does not comprise a low complexity category). As will be understood by a person skilled in the art, this does not include Rel-8 since the Rel-8 version does not comprise a full configuration flag.

In the tables above the Rel-12 flag (relating to Rel-12 or above) is also referred to herein as a first configuration flag setting of the enhanced full configuration flag. The one or more flags relating to whether or not a UE is a low complexity category UE is also referred to herein as a second configuration flag setting. The Rel-9 flag (relating to Rel-9 to Rel-11) is referred to herein as a third configuration flag setting of the enhanced full configuration flag. Thus, in the examples of the tables above, the enhanced full configuration flag comprises a full configuration flag (to indicate whether or not a full configuration is needed), a first configuration flag setting (relating to Rel-12 or above), a second configuration flag setting (to indicate whether or not the UE is a low complexity UE, and a third configuration flag setting (relating to Rel-9 to Rel-11).

Figure 2:
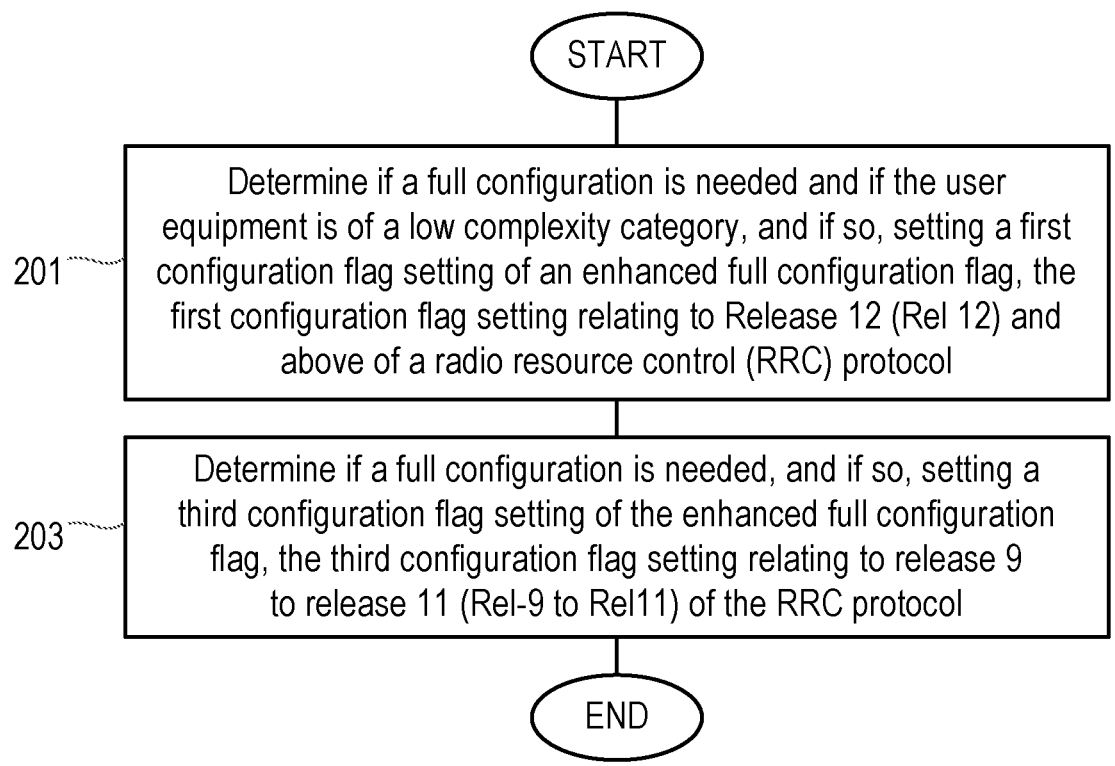
FIG. 2 shows a method according to an embodiment of the invention.

Thus, referring to FIG. 2, according to one embodiment, there is provided a method performed in a target base station during an attempted handover procedure of a user equipment (UE) from a source base station to the target base station. The method comprises the step of determining if a full configuration is needed and if the user equipment is of a low complexity category, and if so, setting a first configuration flag setting of an enhanced full configuration flag, the first configuration flag setting relating to Release 12 (Rel 12) and above of a radio resource control (RRC) protocol, step 201. In step 203 it is determined if a full configuration is needed, and if so, setting a third configuration flag setting of the enhanced full configuration flag, the third configuration flag setting relating to release 9 to release 11 (Rel-9 to Rel11) of the RRC protocol.

The method may further comprise the step of setting a second configuration flag of the enhanced full configuration flag according to whether or not the user equipment is a low complexity category user equipment.

The enhanced full configuration flag may be provided in a RRC configuration message.

The method may involve the target base station combining the following information in order to decide how to set the enhanced full configuration flag. The target base station will receive from a source base station the following field in the handover preparation information:
ue-ConfigRelease This field indicates the RRC protocol release applicable for the current UE configuration. This can be used by the target base station to decide if the full configuration approach should be used. If this field is not present, the target assumes that the current UE configuration is based on the release 8 version of RRC protocol.

The target base station can then further read the UE category from the UE-EUTRA-Capability which is also contained in the handover preparation information message:
ue-RadioAccessCapabilityInfo If the ue-ConfigRelease is a release that is supported by the target base station and the said release defines a low complexity category, and the target base station further comprehends the UE category from the UE-EUTRA-Capability container, then the Rel-12 full configuration flag is set if full configuration is needed.

According to another embodiment a source eNB performs a method for validation of the configuration by inspecting the flag settings. In general, the source eNB is able to decode the RRC configuration that is sent by the target eNB, and therefore it can read the flag setting and infer from it whether the target eNB comprehended the new UE low complexity category or not. The source eNB logic for validation can be described with the following method;
1. If Rel-12 full configuration flag is present and the UE is of category 0, consider the configuration as valid and go to step 4.
2. If a Rel-9 full configuration flag is present and the Rel-12 full configuration flag is absent and the UE is of other category than category 0, consider the configuration as valid and go to step 4.
3. Consider the configuration as invalid, abort the handover execution and go to step 5.
4. Send the handover command to the UE and execute the handover.
5. Procedure ends.

Figure 3:
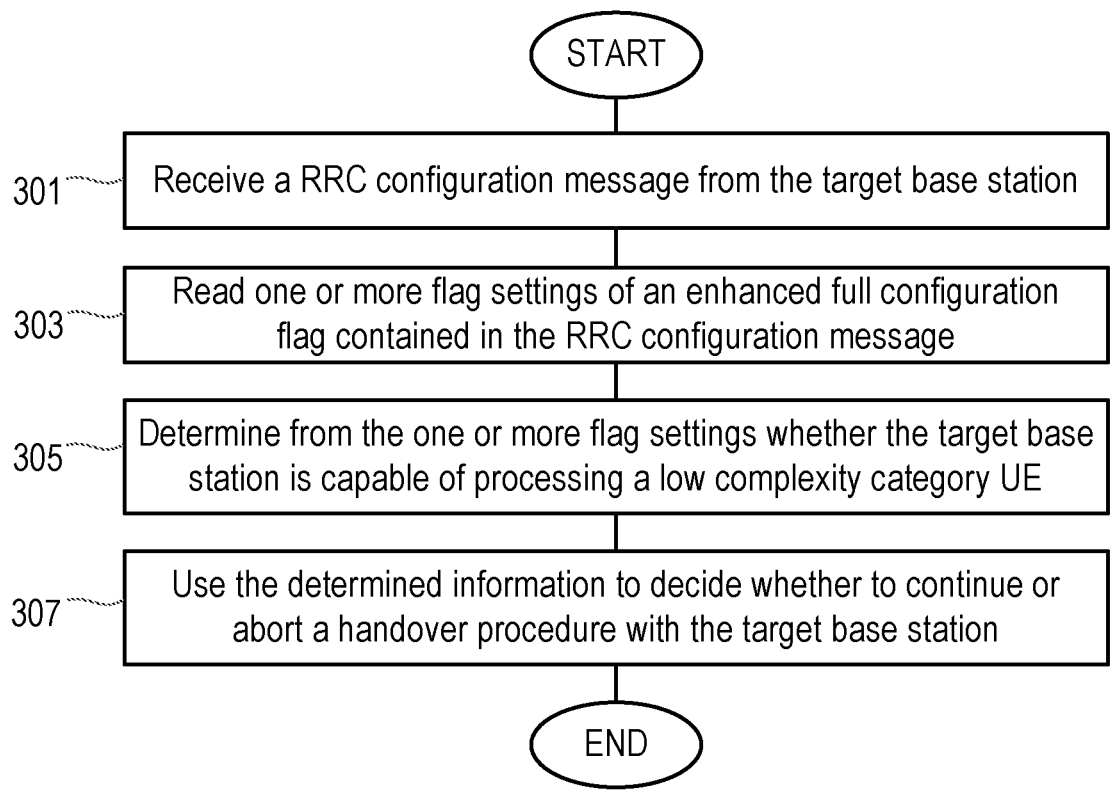
FIG. 3 shows a method according to another embodiment of the invention.

Thus, referring to FIG. 3, according to one embodiment, a method is performed in a source base station during an attempted handover procedure of a user equipment (UE) from the source base station to a target base station. The method comprises the step of receiving a RRC configuration message from the target base station, step 301. The method comprises the step of reading one or more flag settings of an enhanced full configuration flag contained in the RRC configuration message, step 303. From the one or more flag settings it is determined whether the target base station is capable of processing a low complexity category UE, step 305. The determined information is used to decide whether to continue or abort a handover procedure with the target base station, step 307.

The method may comprise the steps of:
(a) determining if a first configuration flag setting relating to Release 12 (Rel-12) or above is present in the enhanced full configuration flag;
(b) determining from a second configuration flag setting of the enhanced full configuration flag if the UE is of a low complexity category; and,
if the outcomes of steps (a) and (b) are positive, considering a configuration as valid and executing the handover operation.

The method described above may further comprise the steps of:
(c) determining if a third configuration flag setting relating to Release 9 to Release 11 (Rel-9 to Rel-11) is present in the enhanced full configuration flag;
(d) determining if a first configuration flag setting relating to release 12 (Rel-12) or above is absent from the enhanced full configuration flag;
(e) determining from a second configuration flag setting of the enhanced full configuration flag if the UE is of a category other than a low complexity category; and,
if the outcomes of steps (c), (d) and (e) are positive, considering the configuration as valid and executing the handover.

The method may further comprise the step of performing a full configuration after the handover operation.

If it is determined that the target base station is not capable of performing a handover operation with the user equipment based on its low complexity category, the method may further comprise the steps of considering the configuration as invalid, and aborting the handover operation with the target base station.

In the method described above, if the outcomes of steps (a) and (b) are not positive, and/or the outcomes of steps (c), (d) and (e) are not positive, the method may further comprise the steps of considering the configuration as invalid, and aborting the handover operation with the target base station.

According to another embodiment, the UE actions upon the reception of the full configuration flag depends on the UE category and the full configuration flag version. The UE can infer from the version if the target eNB has comprehended the correct category. It is possible that the source eNB has transparently forwarded the RRC Configuration without executing the above described validation method for the configuration. The UE actions upon the reception of the full configuration flag can be described with a similar kind of method as the validation method in source eNB, with the difference that the method is executed after the reception of handover command:
1. If a Rel-12 full configuration flag is present and the UE is of category 0, consider the configuration as valid and go to step 4.

2. If a Rel-9 full configuration flag is present and the Rel-12 full configuration flag is absent and the UE is of other category than category 0, consider the configuration as valid and go to step 4.
3. Consider the configuration as invalid, abort the handover execution and go to step 5.
4. Execute the handover and perform full configuration.
5. Procedure ends.

Figure 4:
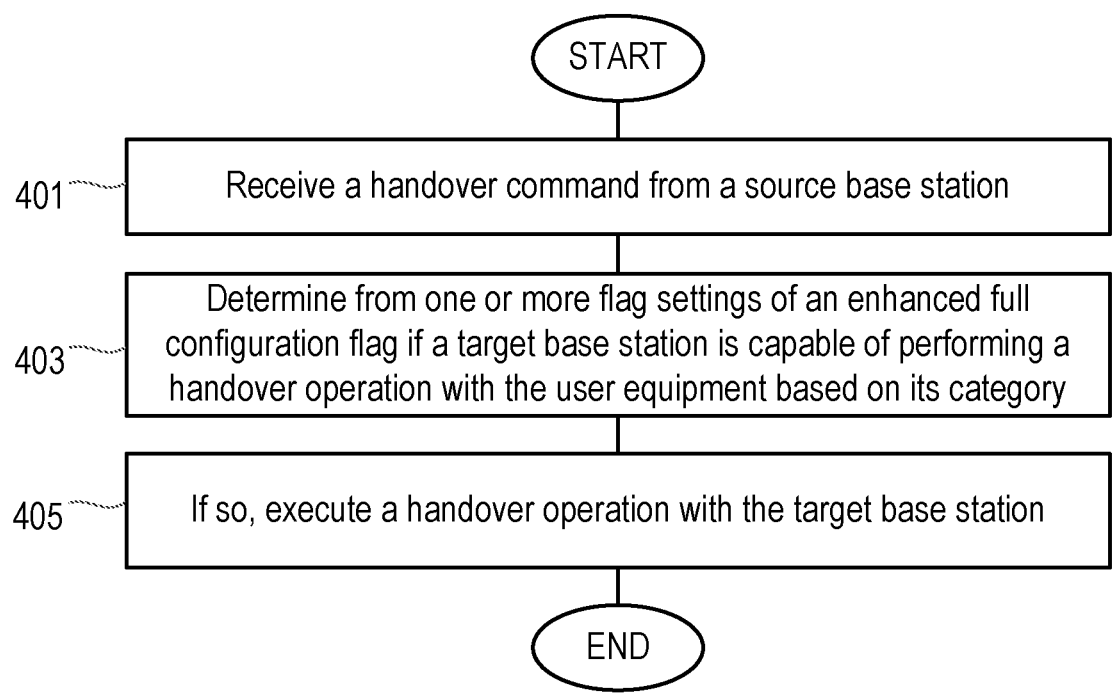
FIG. 4 shows a method according to another embodiment of the invention.

Thus, referring to FIG. 4, according to one embodiment, a method in a user equipment, for use in a handover procedure from a source base station to a target base station, comprising the step of receiving a handover command from a source base station, step 401. In step 403 it is determining from one or more flag settings of an enhanced full configuration flag if a target base station is capable of performing a handover operation with the user equipment based on its category. If so, a handover operation is executed with the target base station, step 405.

In such an embodiment the method may further comprise the steps of:
 (a) determining if a first configuration flag setting relating to Release 12 (Rel-12) or above is present in the enhanced full configuration flag;
 (b) determining from a second configuration flag setting of the enhanced full configuration flag if the UE is of a low complexity category; and,
 if the outcomes of steps (a) and (b) are positive, considering the configuration as valid and executing the handover operation.

In such an embodiment, the method may further comprise the steps of:
 (c) determining if a third configuration flag setting relating to Release 9 to Release 11 (Rel-9 to Rel-11) is present in the enhanced full configuration flag;
 (d) determining if a first configuration flag setting relating to release 12 (Rel-12) or above is absent from the enhanced full configuration flag;
 (e) determining from a second configuration flag setting of the enhanced full configuration flag if the UE is of a category other than a low complexity category; and,
 if the outcomes of steps (c), (d) and (e) are positive, considering the configuration as valid and executing the handover.

The method may further comprise the step of performing a full configuration after the handover operation.

If it is determined that the target base station is not capable of performing a handover operation with the user equipment based on its category, the method may further comprise the steps of considering the configuration as invalid, and aborting the handover operation with the target base station.

If the outcomes of steps (a) and (b) are not positive, and/or the outcomes of steps (c), (d) and (e) are not positive, the method may further comprise the steps of considering the configuration as invalid, and aborting the handover operation with the target base station.

The UE actions upon aborted handover are up to the UE implementation. For example, typically the UE tries to perform RRC connection reestablishment to the source eNB.

It can be seen from the above that the embodiments of the invention introduce a new full configuration flag, an enhanced full configuration flag (comprising a plurality of flag settings), to distinguish full configurations of low complexity category UEs (for example termed category 0 UEs) from full configurations of other categories. Embodiments of the invention provide a method for setting the full configuration flags in a network node, such as a target eNB. Similarly, embodiments of the invention provide a method in a network node, such as a source eNB, for interpreting the flag values and further validating if the RRC configuration prepared by the target eNB can be used by the low complexity category UE, and if the handover can be successfully executed with the configuration. The interpretation and validation methods can also be used by the UE where the interpretation and validation are performed after the transferred handover command, to determine if the UE should abort the handover and resume back to the source eNB by performing e.g. RRC Connection Reestablishment.

Figure 5:
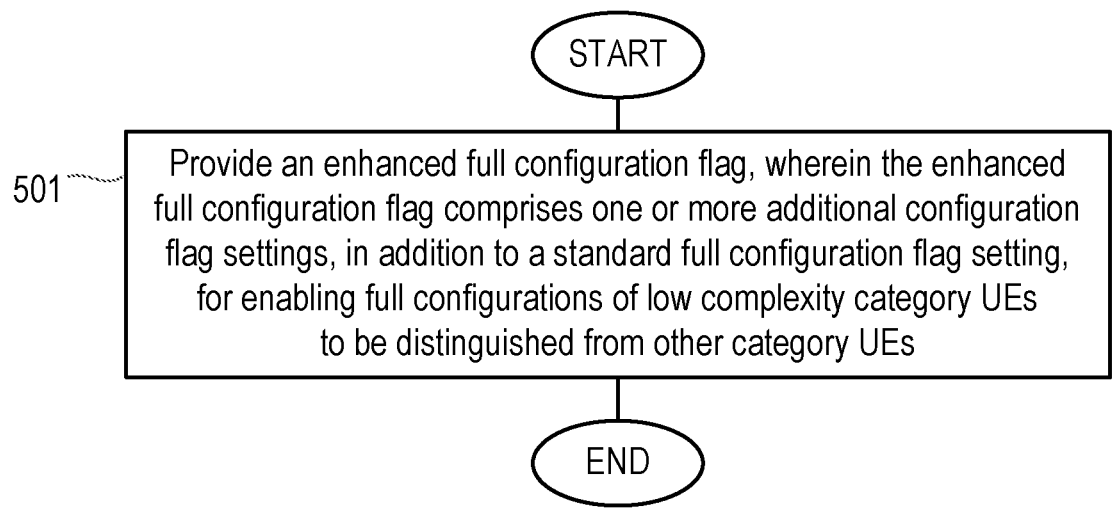
FIG. 5 shows a method according to another embodiment of the invention.

Referring to FIG. 5, according to another embodiment there is provided a method of performing a handover operation of a user equipment from a source base station to a target base station. The method comprises the steps of providing an enhanced full configuration flag, step 505, wherein the enhanced full configuration flag comprises one or more additional configuration flag settings, in addition to a standard full configuration flag setting, for enabling full configurations of low complexity category UEs to be distinguished from other category UEs.

Figure 6:
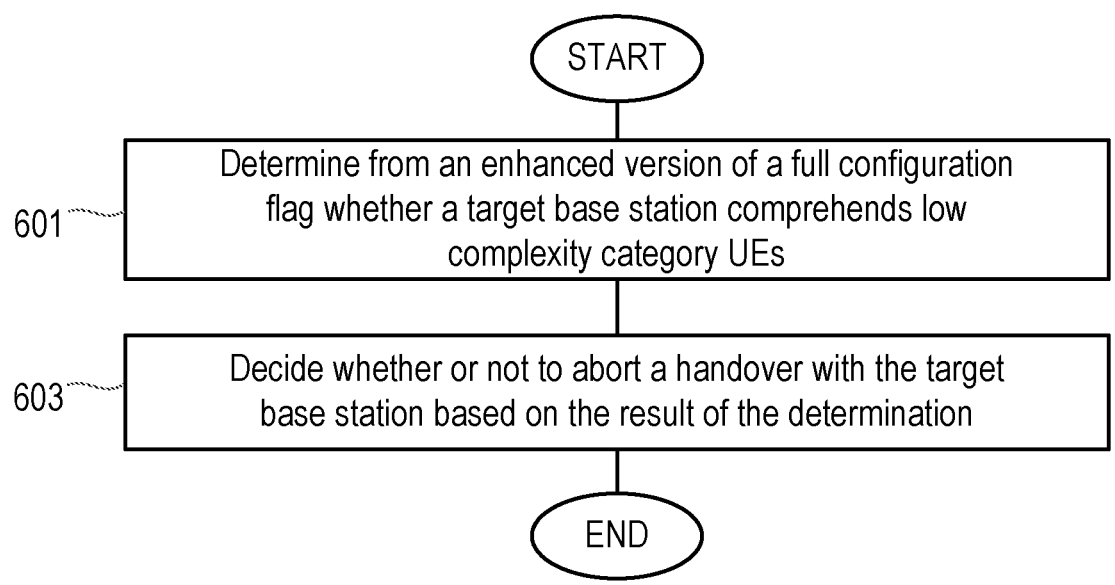
FIG. 6 shows a method according to another embodiment of the invention.

Referring to FIG. 6, according to another embodiment there is provided a method in a user equipment (UE). The method comprises the step of determining from an enhanced version of a full configuration flag whether a target base station comprehends low complexity category UEs, step 601. In step 603 it is decided whether or not to abort a handover with the target base station based on the result of the determination.

Figure 7:
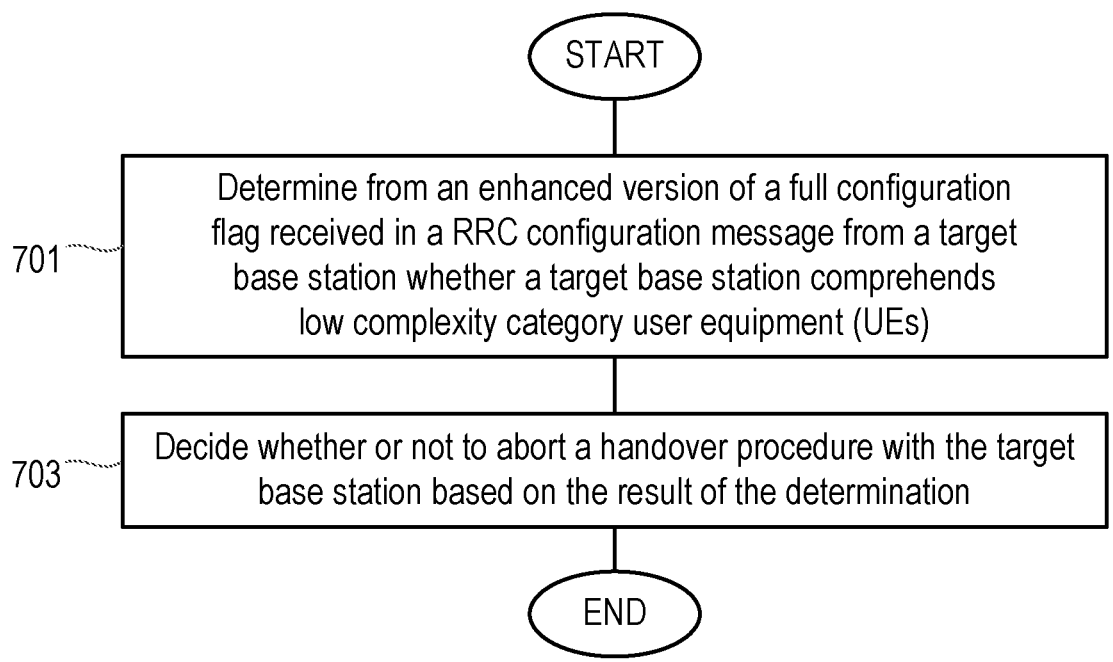
FIG. 7 shows a method according to another embodiment of the invention.

Referring to FIG. 7, according to another embodiment there is provided a method in a source base station. The method comprises the steps of determining from an enhanced version of a full configuration flag received in a RRC configuration message from a target base station whether a target base station comprehends low complexity category user equipment (UEs), step 701. In step 703 it is decided whether or not to abort a handover procedure with the target base station based on the result of the determination.

Figure 8:
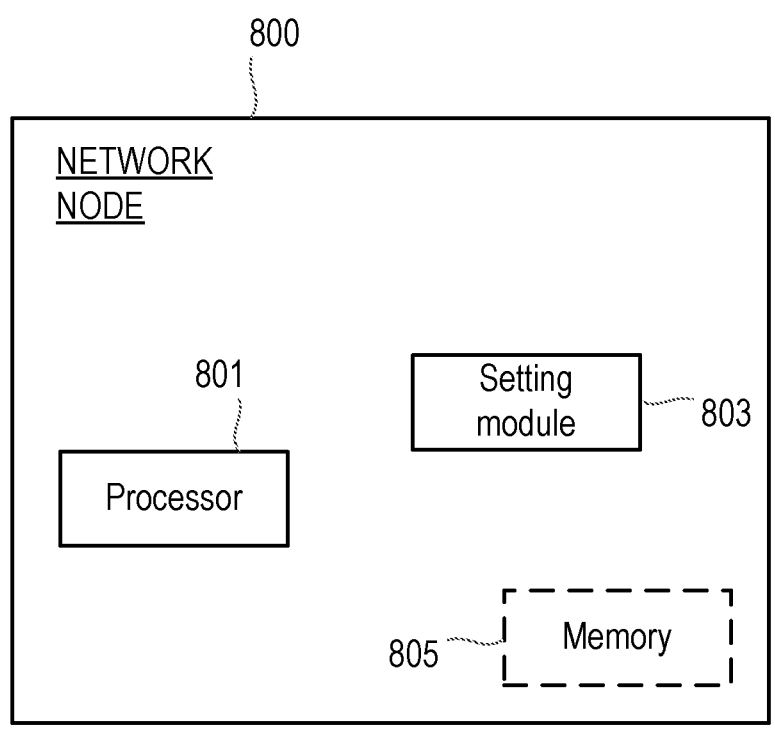
FIG. 8 shows a network node according to an embodiment of the invention.

FIG. 8 shows a target base station 800 according to another embodiment of the invention, for use in an attempted handover procedure of a user equipment (UE) from a source base station to the target base station. The target base station 800 comprises a processing module 801 adapted to determine if a full configuration is needed and if the user equipment is of a low complexity category. A setting module 803 is adapted to set a first configuration flag setting of an enhanced full configuration flag, if it is determined that a full configuration is needed and the user equipment is of a low complexity category, wherein the first configuration flag setting relates to Release 12 (Rel 12) and above of a radio resource control (RRC) protocol. The processing module 801 is further adapted to determine if a full configuration is needed. If so, the setting module 803 is adapted to set a third configuration flag setting of the enhanced full configuration flag, the third configuration flag setting relating to release 9 to release 11 (Rel-9 to Rel11) of the RRC protocol.

Figure 9:
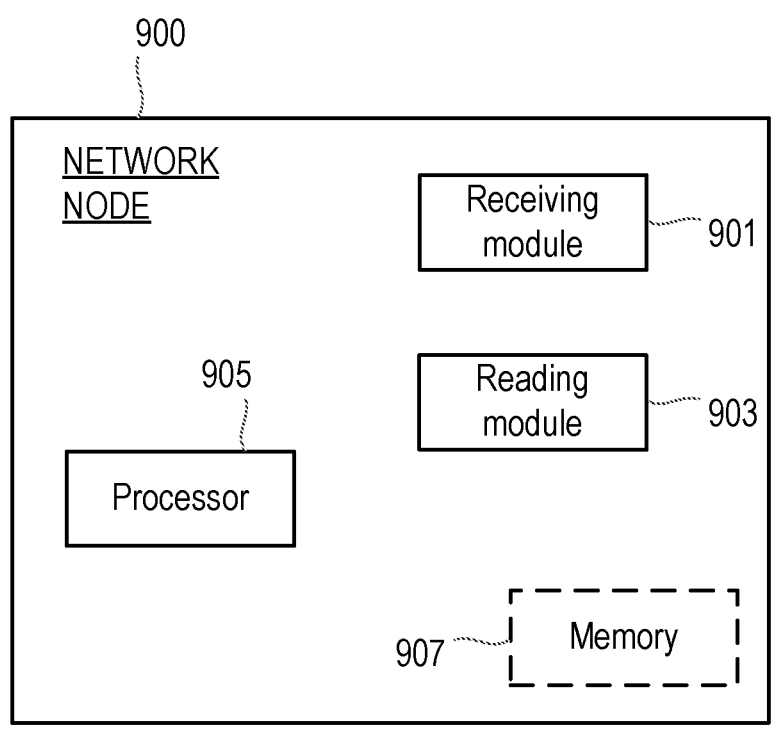
FIG. 9 shows a network node according to an embodiment of the invention.

FIG. 9 shows a source base station 900 according to another embodiment of the present invention, for use in an attempted handover procedure of a user equipment (UE) from the source base station to a target base station. The source base station 900 comprises a receiving module 901 adapted to receive a RRC configuration message from the target base station. A reading module 903 is adapted to read one or more flag settings of an enhanced full configuration flag contained in the RRC configuration message. A processing module 905 is adapted to determine from the one or more flag settings whether the target base station is capable of processing a low complexity category UE. The processing module 905 is adapted to use the determined information to decide whether to continue or abort a handover procedure with the target base station.

Figure 10:
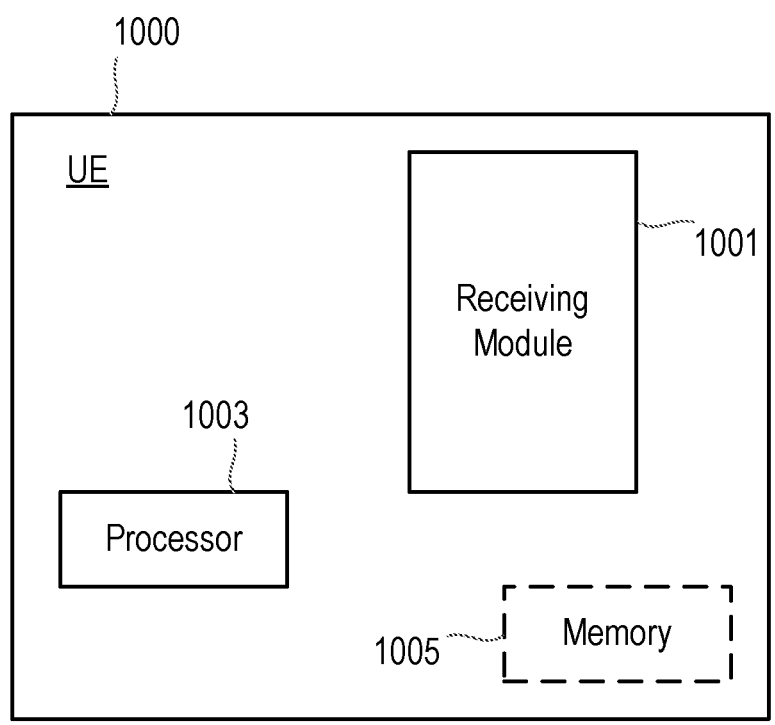
FIG. 10 shows a user equipment according to another embodiment of the invention.

FIG. 10 shows a user equipment 1000 according to another embodiment of the present invention. The user equipment 1000 comprises a receiving module 1001 adapted to receive a handover command from a source base station. A processing unit 1003 is adapted to determine from one or more flag settings of an enhanced full configuration flag if a target base station is capable of performing a handover operation with the user equipment based on its category. The processing unit 1003 is adapted to execute a handover operation with the target base station based on the outcome of the determining process.

Abbreviations

3GPP 3$^{rd}$ Generation Partnership Program
AS Access Stratum
eNB Evolved Node B
E-UTRA Evolved UMTS Terrestrial Radio Access
LTE Long-Term Evolution
MTC Machine Type Communication
UE User Equipment It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed in a source base station during an attempted handover procedure of a user equipment (UE) from the source base station to a target base station, the method comprising:
    transmitting to the target base station a handover preparation message comprising handover preparation information;
    after transmitting the handover preparation message, receiving a RRC configuration message for configuring the UE, wherein the RRC configuration message was transmitted by the target base station and the RRC configuration message comprises an enhanced full configuration flag generated by the target base station based on the handover preparation information;
    after receiving the RRC configuration message, reading one or more flag settings of the enhanced full configuration flag contained in the RRC configuration message transmitted by the target base station;
    determining, based on one or more flag settings of the enhanced full configuration flag contained in the RRC configuration message transmitted by the target base station, whether the target base station is capable of processing a low complexity category UE; and
    using the determined information to decide whether to continue or abort a handover procedure with the target base station.

2. The method of claim 1, wherein the method comprises the steps of:
    (a) determining if a first configuration flag setting relating to Release 12 (Rel-12) or above is present in the enhanced full configuration flag;
    (b) determining from a second configuration flag setting of the enhanced full configuration flag if the UE is of a low complexity category; and,
    if the outcomes of steps (a) and (b) are positive, considering a configuration as valid and executing the handover operation.

3. The method of claim 2, wherein the method comprises the steps of:
    (c) determining if a third configuration flag setting relating to Release 9 to Release 11(Rel-9 to Rel-11) is present in the enhanced full configuration flag;
    (d) determining if a first configuration flag setting relating to release 12 (Rel-12) or above is absent from the enhanced full configuration flag;
    (e) determining from a second configuration flag setting of the enhanced full configuration flag if the UE is of a category other than a low complexity category; and,
    if the outcomes of steps (c), (d) and (e) are positive, considering the configuration as valid and executing the handover.

4. The method of claim 3, wherein if the outcomes of steps (a) and (b) are not positive, and/or the outcomes of steps (c), (d) and (e) are not positive, the method further comprises the steps of considering the configuration as invalid, and aborting the handover operation with the target base station.

5. The method of claim 1, further comprising the step of performing a full configuration after the handover operation.

6. The method of claim 1, further comprising considering the configuration as invalid and aborting the handover operation with the target base station as a result of determining that the target base station is not capable of performing a handover operation with the user equipment based on its low complexity category.

7. A method in a user equipment (UE) for use in a handover procedure from a source base station to a target base station, the method comprising:
    the UE receiving a handover command from a source base station, the handover command comprising an enhanced full configuration flag the source base station obtained from a target base station;
    the UE determining from one or more flag settings of the enhanced full configuration flag whether the target base station is capable of performing a handover operation with the user equipment based on its category; and
    as a result of determining that the target base station is capable of performing the handover operation, the UE executing the handover operation with the target base station.

8. The method of claim 7, wherein the method comprises the steps of:
    (a) determining if a first configuration flag setting relating to Release 12 (Rel-12) or above is present in the enhanced full configuration flag;
    (b) determining from a second configuration flag setting of the enhanced full configuration flag if the UE is of a low complexity category; and,
    if the outcomes of steps (a) and (b) are positive, considering the configuration as valid and executing the handover operation.

9. The method of claim 8, wherein the method comprises the steps of:
    (c) determining if a third configuration flag setting relating to Release 9 to Release 11(Rel-9 to Rel-11) is present in the enhanced full configuration flag;

(d) determining if a first configuration flag setting relating to release 12 (Rel-12) or above is absent from the enhanced full configuration flag;

(e) determining from a second configuration flag setting of the enhanced full configuration flag if the UE is of a category other than a low complexity category; and, if the outcomes of steps (c), (d) and (e) are positive, considering the configuration as valid and executing the handover.

10. The method of claim 9, wherein if the outcomes of steps (a) and (b) are not positive, and/or the outcomes of steps (c), (d) and (e) are not positive, the method further comprises the steps of considering the configuration as invalid, and aborting the handover operation with the target base station.

11. The method of claim 7, further comprising the step of performing a full configuration after the handover operation.

12. The method of claim 7, wherein if it is determined that the target base station is not capable of performing a handover operation with the user equipment based on its category, the method further comprises the steps of considering the configuration as invalid, and aborting the handover operation with the target base station.

13. A method of performing a handover operation of a user equipment (UE) from a source base station to a target base station, the method comprising:
the target base station receiving handover preparation information for a handover of the UE, wherein the handover preparation information was transmitted to the target base station by the source base station;
the target base station determining, based on the handover preparation information, a current radio resource control (RRC) configuration used by the UE;
after determining the current RRC configuration, the target base station preparing an RRC configuration message based on the determined current RRC configuration, the RRC configuration message comprising an enhanced full configuration flag; and
the target base station transmitting to the source base station the RRC configuration message containing the enhanced full configuration flag, wherein the enhanced full configuration flag comprises one or more additional configuration flag settings, in addition to a standard full configuration flag setting, for enabling full configurations of low complexity category UEs to be distinguished from other category UEs.

14. A method in a source base station, the method comprising:
transmitting to a target base station a handover preparation message comprising handover preparation information;
after transmitting the handover preparation message, receiving an RRC configuration message, wherein the RRC configuration message was transmitted by the target base station and the RRC configuration message comprises an enhanced full configuration flag generated by the target base station based on the handover preparation information;
after receiving the RRC configuration message, determining, based on the enhanced full configuration flag received in the RRC configuration message, whether the target base station comprehends low complexity category user equipment (UEs), and
deciding whether or not to abort a handover procedure with the target base station based on the result of the determination.

15. A source base station for use in an attempted handover procedure of a user equipment (UE) from the source base station to a target base station, the source base station comprising:
a transmitter;
a memory; and
a processor coupled to the memory, wherein the source base station is configured to:
employ the transmitter to transmit handover preparation information for the target base station;
read one or more flag settings of an enhanced full configuration flag contained in an RRC configuration message transmitted by the target base station, wherein the target base station generated the enhanced full configuration flag contained in the RRC message based on the handover preparation information transmitted by the source base station;
determine from the one or more flag settings whether the target base station is capable of processing a low complexity category UE; and
decide whether to continue or abort a handover procedure with the target base station based on whether the target base station is capable of processing a low complexity category UE.

16. A user equipment comprising:
a receiver for receiving a handover command transmitted by a source base station, the handover command comprising an enhanced full configuration flag generated by a target base station based on hand over preparation information provided by the source base station;
a memory; and
a processor coupled to the memory, wherein the user equipment is configured to:
determine from one or more flag settings of the enhanced full configuration flag whether the target base station is capable of performing a handover operation with the user equipment based on the user equipment's category; and
as a result of determining that the target base station is capable of performing the handover operation, execute the handover operation with the target base station.

* * * * *